(12) United States Patent
Bastin et al.

(10) Patent No.: US 9,469,754 B2
(45) Date of Patent: Oct. 18, 2016

(54) SURFACE COVERING

(75) Inventors: Pierre Bastin, Wiltz (LU); André Zeller, Wiltz (LU)

(73) Assignee: Tarkett GDL S.A., Lentzweiler (LU)

( * ) Notice: Subject to any disclaimer, the term of this patent is extended or adjusted under 35 U.S.C. 154(b) by 0 days.

(21) Appl. No.: 14/408,765

(22) PCT Filed: Jul. 4, 2012

(86) PCT No.: PCT/EP2012/063025
§ 371 (c)(1),
(2), (4) Date: Jun. 3, 2015

(87) PCT Pub. No.: WO2014/005631
PCT Pub. Date: Jan. 9, 2014

(65) Prior Publication Data
US 2015/0267043 A1 Sep. 24, 2015

(51) Int. Cl.
| | |
|---|---|
| *B32B 23/08* | (2006.01) |
| *B32B 27/32* | (2006.01) |
| *B32B 27/20* | (2006.01) |
| *C08L 23/06* | (2006.01) |
| *C08L 71/02* | (2006.01) |
| *C08L 31/04* | (2006.01) |
| *C08L 23/08* | (2006.01) |
| *C08L 23/16* | (2006.01) |
| *B32B 27/08* | (2006.01) |
| *E04F 15/10* | (2006.01) |

(52) U.S. Cl.
CPC ............... *C08L 23/06* (2013.01); *B32B 27/08* (2013.01); *B32B 27/20* (2013.01); *B32B 27/32* (2013.01); *C08L 23/08* (2013.01); *C08L 23/0869* (2013.01); *C08L 31/04* (2013.01); *C08L 71/02* (2013.01); *B32B 2264/102* (2013.01); *B32B 2264/104* (2013.01); *B32B 2419/04* (2013.01); *C08L 23/0815* (2013.01); *C08L 23/0853* (2013.01); *C08L 23/16* (2013.01); *C08L 2201/08* (2013.01); *C08L 2205/02* (2013.01); *C08L 2205/035* (2013.01); *C08L 2205/06* (2013.01); *C08L 2207/066* (2013.01); *E04F 15/105* (2013.01); *E04F 15/107* (2013.01); *Y10T 428/31551* (2015.04)

(58) Field of Classification Search
None
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 2012/0309876 A1* | 12/2012 | Bastin .............. C08L 23/0815 524/275 |

FOREIGN PATENT DOCUMENTS

WO  WO2011/063849  *  3/2011

OTHER PUBLICATIONS

Charles A. Harper; "Handbook of Plastics, Elastomers, and Composites"; McGraw-Hill Fourth Edition; New York, NY; 2002; p. 194-196 (5 pages).

* cited by examiner

*Primary Examiner* — Sheeba Ahmed
(74) *Attorney, Agent, or Firm* — Reinhart Boerner Van Deuren P.C.

(57) ABSTRACT

The present invention relates to a PVC-free multiple layer surface covering comprising at least one layer of a thermoplastic composition, the thermoplastic composition comprising a polymer-based matrix representing 100 parts in weight and comprising one or more olefin-based polymer(s) and one or more anhydride copolymer(s), said one or more anhydride copolymer(s) representing between 5 and 40 parts in weight of the polymer-based matrix, one or more filler(s) representing in weight at least 100 parts per 100 parts of said polymer-based matrix, one or more basic or amphoteric metal oxide(s) representing between 5 and 40 parts in weight per 100 parts of said polymer-based matrix.

19 Claims, No Drawings

SURFACE COVERING

FIELD OF THE INVENTION

The present invention relates to a PVC-free multiple layer surface covering comprising at least one layer of a thermoplastic composition comprising a polymer-based matrix comprising one or more olefin-based polymer(s) and one or more anhydride copolymer(s), a high content of fillers and a processing additive being one or more basic or amphoteric metal oxide(s).

PRIOR ART AND RELATED TECHNICAL BACKGROUND

Synthetic surface coverings, such as floor or wall coverings, are well known. Among them, multiple layer coverings usually comprise a lower layer known as "support layer", and an upper layer known as "wear layer".

In opposition to other polymeric sheet materials, a floor or wall covering and the different layers of a multiple layer covering have specific properties in terms of flexibility and mechanical resistance.

Surface coverings, and particularly support layers, are usually PVC-based. However due to environmental issues on PVC coverings, alternatives to PVC coverings were developed, for example polyolefin-based surface coverings or surface coverings comprising acid-based polymer(s) being in a neutralized form or not.

However, such surface coverings present several drawbacks, among which poor mechanical properties, especially poor residual indentation.

Furthermore, a polymer-based layer composition comprising a significant amount of fillers, for example a composition comprising a ratio in weight filler/polymer(s) of 1 or more, is difficult to be calendered into a thin sheet and the extractability of the sheet from a hot calender device is a critical issue.

Therefore, for surface coverings comprising at least one layer of a thermoplastic composition comprising a significant amount of fillers, there is a need to improve easiness of production of such surface coverings and to improve their residual indentation properties.

AIMS OF THE INVENTION

The present invention aims to provide a multiple layer surface covering which does not have the drawbacks of the prior art.

The invention aims to provide a multiple layer surface covering having improved residual indentation.

SUMMARY OF THE INVENTION

The present invention discloses a PVC-free multiple layer surface covering comprising at least one layer of a thermoplastic composition, the thermoplastic composition comprising a polymer-based matrix representing 100 parts in weight and comprising one or more olefin-based polymer(s) and one or more anhydride copolymer(s), said one or more anhydride copolymer(s) representing between 5 and 40 parts in weight of the polymer-based matrix, one or more filler(s) representing in weight at least 100 parts per 100 parts of said polymer-based matrix, one or more basic or amphoteric metal oxide(s) representing between 5 and 40 parts in weight per 100 parts of said polymer-based matrix.

According to particular embodiments, the PVC-free multiple layer surface covering may comprise one, or a suitable combination of one or several, of the following characteristics:

- the polymer-based matrix comprises EVA, EMA, EBA, EEA, EPM, EPDM, VLDPE, LLDPE, polyolefin elastomers (POE), polyolefin plastomers (POP) or a combination thereof,
- the one or more anhydride copolymer(s) represents between 10 and 40 parts in weight of the polymer-based matrix and the one or more basic or amphoteric metal oxide(s) represents between 7.5 and 22.5 parts in weight per 100 parts of said polymer-based matrix,
- the one or more filler(s) represents in weight between 200 and 350 parts per 100 parts of the polymer-based matrix,
- the one or more filler(s) is calcium carbonate and/or calcium magnesium carbonate,
- the anhydride copolymer comprises maleic anhydride monomers or olefin monomers grafted maleic anhydride groups,
- the one or more metal oxide is natrium oxide, lithium oxide, potassium oxide, rubidium oxide, iron oxide, beryllium oxide, magnesium oxide, calcium oxide, strontium oxide, barium oxide, copper oxide, aluminum oxide, lead oxide, zinc oxide or a combination thereof,
- the thermoplastic composition further comprises thermal or light stabilizers, antistatic additives, processing oils and/or other processing additives,
- the at least one layer of a thermoplastic composition is a support layer and said of PVC-free surface covering is a multiple layer surface covering,
- the PVC-free surface covering comprises a wear layer over the support layer and a polyurethane-based varnish layer over the wear layer.

DETAILED DESCRIPTION OF THE INVENTION

The present invention relates to a PVC-free multiple layer surface covering, preferably a decorative surface covering, in particular a floor or a wall covering of at least one (one or more) layer, said layer being made of a thermoplastic composition comprising a polymer-based matrix.

The polymer-based matrix comprises at least one, preferably two or more, olefin-based polymer(s), said olefin-based polymer being either EVA, EMA, EBA, EEA, EPM, EPDM, VLDPE, LLDPE, polyolefin elastomers (POE), polyolefin plastomers (POP) or a combination thereof.

Concerning the definition of POE and POP we refer to the "*Handbook of Plastics Elastomers and Composites*, Charles A. Harper, 4th edition, Mc Graw-Hill Handbooks, p 195, elastomer and plastomer resins may also be defined as being elastomer when the content of octene monomer is less than 20%, and as being plastomer when the content of octene monomer is more than 20%.

Despite the fact that POE and POP are defined by their content of octene monomer, it has to be noted that they may comprise butene and/or hexene monomers.

The polyolefin elastomer or plastomers are disclosed in U.S. Pat. No. 5,272,236 and U.S. Pat. No. 5,278,272, the disclosures of which are incorporated herein by reference.

Polyethylene based polymers are, for example, VLDPE (very low density polyethylene) with a density range of 0.880-0.915 g/cm$^3$ (ASTM D792), LLDPE (linear low density polyethylene) with a density range of 0.915-0.925 g/cm$^3$ (ASTM D792), polyolefin elastomers (POEs) or plastomers (POPs) with a density of 0.87-0.902 g/cm$^3$ (ASTM D792), POEs having a density around 0.87 g/cm³ and the POPs having a density around 0.90 g/cm³.

Preferably, the olefin-based polymer or polymers in the thermoplastic composition have preferably a melt flow index (MFI) between 0.6 to 3 g/10 min at 190° C., under 2.16 kg weight.

The thermoplastic composition further comprises an anhydride copolymer, or mixture of anhydride copolymers A "copolymer" means a polymer containing two or more monomers and as such the terms includes "bipolymer", "terpolymer" and polymer produced from more than three monomers, the terms "bipolymer" and "terpolymer" meaning polymers containing respectively two and three monomers. "Copolymer" means also polymer containing two or more identical or different monomers. An "anhydride copolymer" means that the polymer comprises anhydride-based monomers.

The anhydride-based copolymer comprises olefin monomers, preferably ethylene, propylene, butylene, hexylene or octylene monomers.

The anhydride copolymer comprises anhydride-based monomers being anhydride monomers and/or olefin monomers grafted with anhydride groups.

The anhydride copolymer comprises either one type of anhydride monomers or a combination of anhydride monomers of various types.

The anhydride copolymer comprises between 0.5 and 3.1% of anhydride-based monomers based on the total weight of the copolymer.

The anhydride copolymer represents between 5 to 40 parts in weight, preferably between 7.5 and 40 parts in weight, and more preferably 10 to 30 parts in weight per 100 parts of the total amount of polymers in the polymer-based matrix.

The anhydride copolymer comprises preferably maleic anhydride groups.

Preferably, the anhydride copolymer is a terpolymer of ethylene-acrylic ester-maleic anhydride.

For example, the anhydride copolymer may be a polyethylene incorporating maleic anhydride monomers and having a density of around 0.94 g/cm³ and a MFI of around 25 g/10 min, or a terpolymer of ethylene, butyl-acrylate and maleic anhydride, said terpolymer having a density of around 0.94 g/cm³ and a MFI of around 5 g/10 min, or a polyolefin plastomer or elastomer, obtained by a metallocene catalysis and chemically modified to incorporate maleic anhydride, and having a density of around 0.88 g/cm³ and a MFI of around 3.7 g/10 min, or an EVA polymer chemically modified to incorporate maleic anhydride, and having a density of around 0.96 g/cm³ and a MFI of around 1.4 g/10 min.

The thermoplastic composition further comprises at least one (one or more) filler, said filler representing in weight at least 100 parts, preferably between 100 and 500, more preferably between 200 and 350 parts in weight, per 100 parts in weight of the total amount of polymers in the polymer-based matrix.

The filler is either calcium carbonate, calcium magnesium carbonate or a combination thereof.

The thermoplastic composition further comprises a processing additive being a metal oxide, or a mixture of metal oxides.

The metal oxide or oxides are basic or amphoteric metal oxide or oxides.

Preferably, the metal oxide is natrium oxide, lithium oxide, potassium oxide, rubidium oxide ($Rb_2O$, $Rb_2O_2$, $Rb_2O_3$, $RbO_2$), iron oxide (FeO, $Fe_3O_4$, $Fe_2O_3$), beryllium oxide, magnesium oxide, calcium oxide, strontium oxide, barium oxide, copper oxide (CuO, $Cu_2O$), aluminum oxide, lead oxide (PbO, $PbO_2$, $Pb_3O_4$), zinc oxide.

Preferably, the metal oxide is Zinc oxide.

The metal oxide or combination of metal oxides represents in weight between 5 and 40 parts, preferably between 7.5 and 22.5 parts, preferably, more preferably between 10 to 20 parts, per 100 parts in weight of the total amount of polymers in the polymer-based matrix.

The thermoplastic composition may further comprise other additives, for example, thermal or light stabilizers, antistatic additives, processing oils, preferably mineral processing oils, for example paraffinic or naphthenic oil, and other processing additives, such as stearic acid.

The type and quantity of these additives are adapted to the process and to the type and quantity of components of the thermoplastic composition.

Preferably, the other additives represent in weight between 0.5 and 27 parts in weigh per 100 parts in weight of the total amount of polymers in the polymer-based matrix.

Preferably, the thermoplastic composition is processed to produce a layer being a support layer of a multiple layer surface covering. Such multiple layer surface covering further comprises a wear layer and optionally a polyurethane coating, as varnish layer, over the wear layer.

Preferably, the thermoplastic composition is worked in calendar mills in which the roll temperatures is comprised between 150° C. and 230° C., preferably between 180° C. and 210° C.

EXAMPLES

Comparatives examples are layers (support layers of a multiple layer surface covering) having the thermoplastic compositions given in table 1.

The comparative examples are a composition comprising a polymeric matrix without anhydride co-polymer and without metal oxide (example C1 of table 1), compositions comprising a polymeric matrix and an acid-based copolymer (examples C2 to C4 of table 1) and compositions comprising a polymeric matrix comprising an acid-based copolymer ionomer partially neutralised with Zn ions (examples C5 to C7 of tables 1 and 2).

Further thermoplastic compositions having the same polymeric matrix as the compositions according to the invention with the anhydride copolymer but without the processing additive (examples C8 to C10 of table 2) and without the anhydride copolymer but with the processing additive (example C11), are also used as comparatives examples.

In all the examples (comparatives examples and examples according to the invention) the proportion of each components are given in percent by weight in respect to 100 parts of the total amount of polymers in the polymer-based matrix.

TABLE 1

Thermoplastic compositions as comparative examples.

| | C1 | C2 | C3 | C4 | C5 | C6 |
|---|---|---|---|---|---|---|
| Pol1 | 0 | 10 | 20 | 30 | 0 | 0 |
| Pol2 | 0 | 0 | 0 | 0 | 10 | 20 |
| Pol3 | 33 | 30 | 27 | 24 | 30 | 27 |
| Pol4 | 33 | 30 | 27 | 24 | 30 | 27 |
| Pol5 | 34 | 30 | 26 | 22 | 30 | 26 |
| Filler-1 | 300 | 300 | 300 | 300 | 300 | 300 |
| Anhydride | 0 | 0 | 0 | 0 | 0 | 0 |

TABLE 1-continued

Thermoplastic compositions as comparative examples.

|  | C1 | C2 | C3 | C4 | C5 | C6 |
|---|---|---|---|---|---|---|
| co-polymer-1 Metal oxide | 0 | 0 | 0 | 0 | 0 | 0 |
| Anti-oxidant | 0.3 | 0.3 | 0.3 | 0.3 | 0.3 | 0.3 |
| Mineral oil | 18 | 18 | 18 | 18 | 18 | 18 |
| Stearic acid | 2 | 2 | 2 | 2 | 2 | 2 |

TABLE 2

Thermoplastic compositions as comparative examples.

|  | C7 | C8 | C9 | C10 | C11 | C12 |
|---|---|---|---|---|---|---|
| Pol1 | 0 | 0 | 0 | 0 | 0 | 0 |
| Pol2 | 30 | 0 | 0 | 0 | 0 | 0 |
| Pol3 | 24 | 30 | 27 | 24 | 33 | 30 |
| Pol4 | 24 | 30 | 27 | 24 | 33 | 30 |
| Pol5 | 22 | 30 | 26 | 22 | 34 | 25 |
| Filler-1 | 300 | 300 | 300 | 300 | 300 | 300 |
| Anhydride co-polymer-1 | 0 | 10 | 20 | 30 | 0 | 15 |
| Metal oxide-1 | 0 | 0 | 0 | 0 | 10 | 0 |
| Metal oxide-2 | 0 | 0 | 0 | 0 | 0 | 10 |
| Anti-oxidant | 0.3 | 0.3 | 0.3 | 0.3 | 0.3 | 0.3 |
| Mineral oil | 18 | 18 | 18 | 18 | 18 | 18 |
| Stearic acid | 2 | 2 | 2 | 2 | 2 | 2 |

In tables 1 and 2, Pol1 is Bynel 2002 from DuPOnt, a terpolymer ethylene-acrylate-metacrylic acid comprising around 10% of metacrylic acid weight percent. Pol2 is Surlyn® 9320 from Dupont, an acid-based terpolymer partially neutralised with Zn ions to form an ionomer. Pol3 is Clearflex® CLDO from Polimeri a VLDPE. Pol4 is Greenflex® ML 50 from Polimeri, an EVA. Pol5 is Tafmer DF 710 from Mitsui a POE. Filler-1 is CaCO₃, Craie VS 35 from Omya. The anhydride copolymer 1 is Fusabond® 525 from DuPont. The metal oxide-1 is ZnO called "Oxyde de Zinc Neige A" from Umicore. The metal oxide-2 is titanium oxide, RC82 from Warwick. The antioxidant is Irganox 1010 from BASF. The Mineral oil is PO 6116 WOP (paraffinic process oil) from PetroCenter The stearic acid is Radiacid 0444 from Oleon.

Examples according to the invention are given in tables 3 to 6.

TABLE 3

Thermoplastic compositions as examples according to the invention.

|  | Ex1 | EX2 | EX3 | EX4 | EX5 | EX6 | Ex7 | EX8 | EX9 |
|---|---|---|---|---|---|---|---|---|---|
| Pol3 | 30 | 30 | 30 | 30 | 30 | 30 | 30 | 30 | 30 |
| Pol4 | 30 | 30 | 30 | 30 | 30 | 30 | 30 | 30 | 30 |
| Pol5 | 25 | 25 | 25 | 25 | 25 | 25 | 25 | 25 | 25 |
| Filler-1 | 300 | 300 | 300 | 300 | 300 | 300 | 300 | 300 | 300 |
| Anhydride copolymer-1 | 15 | 15 | 0 | 0 | 15 | 0 | 15 | 15 | 15 |
| Anhydride copolymer-2 | 0 | 0 | 15 | 15 | 0 | 15 | 0 | 0 | 0 |
| Metal Oxide-1 | 5 | 10 | 5 | 10 | 15 | 15 | 10 | 0 | 0 |
| Metal Oxide-3 | 0 | 0 | 0 | 0 | 0 | 0 | 0 | 10 | 0 |
| Metal Oxide-4 | 0 | 0 | 0 | 0 | 0 | 0 | 0 | 0 | 10 |
| Metal Oxide-5 | 0 | 0 | 0 | 0 | 0 | 0 | 0 | 0 | 0 |
| Antioxidant | 0.3 | 0.3 | 0.3 | 0.3 | 0.3 | 0.3 | 0.3 | 0.3 | 0.3 |
| Mineral oil | 18 | 18 | 18 | 18 | 18 | 18 | 18 | 18 | 18 |
| Stearic acid | 2 | 2 | 2 | 2 | 2 | 2 | 2 | 2 | 2 |

TABLE 4

Thermoplastic compositions as examples according to the invention.

|  | EX10 | Ex11 | EX12 | EX13 | EX14 | EX15 | EX16 |
|---|---|---|---|---|---|---|---|
| Pol3 | 30 | 30 | 30 | 30 | 20 | 30 | 32.5 |
| Pol4 | 30 | 30 | 30 | 30 | 20 | 35 | 30 |
| Pol5 | 25 | 25 | 25 | 25 | 20 | 30 | 30 |
| Filler-1 | 300 | 100 | 200 | 350 | 200 | 300 | 300 |
| Anhydride copolymer-1 | 15 | 15 | 15 | 15 | 40 | 5 | 7.5 |
| Metal Oxide-1 | 0 | 15 | 10 | 7.5 | 8 | 10 | 7.5 |
| Metal Oxide-3 | 0 | 0 | 0 | 0 | 0 | 0 | 0 |
| Metal Oxide-4 | 0 | 0 | 0 | 0 | 0 | 0 | 0 |
| Metal Oxide-5 | 10 | 0 | 0 | 0 | 0 | 0 | 0 |
| Antioxidant | 0.3 | 0.3 | 0.3 | 0.3 | 0.3 | 0.3 | 0.3 |
| Mineral oil | 18 | 5 | 10 | 20 | 10 | 18 | 18 |
| Stearic acid | 2 | 0.5 | 1 | 2 | 2 | 2 | 2 |

TABLE 5

Thermoplastic compositions as examples according to the invention.

|  | Ex17 | Ex18 | Ex19 | EX20 | EX21 | Ex22 | Ex23 |
|---|---|---|---|---|---|---|---|
| Pol3 | 30 | 30 | 30 | 50 | 30 | 30 | 30 |
| Pol4 | 30 | 30 | 30 | 20 | 30 | 30 | 30 |
| Pol5 | 30 | 30 | 25 | 15 | 25 | 25 | 25 |
| Filler-1 | 300 | 300 | 400 | 500 | 300 | 0 | 0 |
| Filler-2 | 0 | 0 | 0 | 0 | 0 | 300 | 350 |
| Anhydride copolymer-1 | 10 | 10 | 15 | 15 | 15 | 15 | 15 |
| Metal Oxide-1 | 10 | 10 | 15 | 15 | 5 | 10 | 10 |
| Metal Oxide-3 | 0 | 0 | 7.5 | 7.5 | 0 | 0 | 0 |
| Metal Oxide-4 | 0 | 0 | 0 | 0 | 5 | 0 | 0 |
| Metal Oxide-5 | 0 | 0 | 0 | 0 | 0 | 0 | 0 |
| Antioxidant | 0.3 | 0.3 | 0.3 | 0.3 | 0.3 | 0.3 | 0.3 |
| Mineral oil | 18 | 18 | 18 | 18 | 18 | 15 | 18 |
| Stearic acid | 2 | 2 | 2.2 | 2.5 | 2 | 2 | 2 |

TABLE 6

Thermoplastic compositions as examples according to the invention.

|  | Ex24 | Ex25 | Ex26 | Ex27 | EX28 | EX29 | EX30 | EX31 |
|---|---|---|---|---|---|---|---|---|
| Pol3 | 30 | 67.5 | 50 | 50 | 50 | 50 | 40 | 60 |
| Pol4 | 30 | 15 | 20 | 20 | 0 | 0 | 0 | 0 |
| Pol5 | 25 | 10 | 15 | 15 | 30 | 30 | 20 | 20 |
| Filler-1 | 175 | 300 | 300 | 200 | 200 | 100 | 200 | 500 |
| Filler-2 | 175 | 0 | 0 | 0 | 0 | 0 | 0 | 0 |
| Anhydride copolymer-1 | 15 | 7.5 | 15 | 15 | 20 | 25 | 40 | 20 |
| Metal Oxide-1 | 10 | 15 | 20 | 20 | 30 | 40 | 40 | 15 |
| Antioxidant | 0.3 | 0.3 | 0.3 | 0.3 | 0.3 | 0.3 | 0.3 | 0.3 |
| Mineral oil | 18 | 18 | 18 | 10 | 10 | 5 | 5 | 25 |
| Stearic acid | 2 | 2 | 2 | 1 | 1 | 0.5 | 0.5 | 3 |

In tables 3 to 6, the components are the same as in table 1. The anhydride copolymer-1 is Fusabond® 525 from DuPont an elastomer, obtained by a metallocene-based catalysis, and comprising around 1% of maleic anhydride. The anhydride copolymer-2 is Fusabond® 603 (PE with anhydride groups) or Fusabond® 250 (EVA with acid anhydride groups). Filler-1 is $CaCO_3$, Craie VS 35 from Omya. Filler-2 is Dolomie DRB 4/15 from BMP. The metal oxide-1 is ZnO, oxyde de Neige A from umicore. The metal oxide-3 is calcium oxide, 208159 from sigma Aldrich. The metal oxide-4 is magnesium oxide, 342777 from sigma Aldrich. The metal oxide-5 is copper (II) oxide, 450804 from Sigma Aldrich.

The thermoplastic compositions of the comparatives examples, and examples according to the invention, are processed by mixing all the components together before being calendered, using a calendering device, to give a 2 mm thick sheet, the working temperature being between 110 and 200° C. This sheet is used as a support layer in a multiple layer surface covering further comprising a coextruded wear layer comprising a 20 μm thick layer comprising Nucrel 0903 from Dupont and a 180 μm thick layer comprising Surlyn 1706 from Dupont, the face of the wear layer comprising Nucrel 0903 being brought into contact to the support layer and submitted 5 minutes to heat at 180° C.

The extractability of the calendered layers and residual indentation properties of all the examples were assessed and the results are given in tables 7 and 8.

The extractability properties from a hot calender device of the sheets produced from the compositions of the examples was assessed on a two roll mill calender heated at 165° C. A note is given to the extractability ability of the sheets, "1" meaning excellent extractability, i.e. identical to what is obtained with a PVC-based sheet, "5" meaning bad extractability and no possibility to be calendered like PVC-based sheets, "3" meaning poor extractability with adhesions leading to some difficulties to be calendered.

The residual indentation was assessed according to an in-house test wherein a surface of around 0.25 cm² of a sample, having a thickness of around 2 mm, is submitted to a pressure (500 N) of a weight of 50 kg applied during 60 seconds. The total deformation is measured and the residual indentation (given in millimeters) is measured 60 seconds after stopping the pressure. A note is given to the residual indentation of the sheets, "1" meaning excellent residual indentation, i.e. 0.1 to 0.3 mm, "3" meaning acceptable residual indentation, i.e. 0.4 to 0.7 mm and "5" meaning bad residual indentation, i.e. above 0.8 mm.

TABLE 7 extractability and residual indentation properties of comparatives examples.

|  | Extractability | Residual indentation |
|---|---|---|
| C1 | 2 | 5 |
| C2 | 3 | 5 |
| C3 | 3 | 5 |
| C4 | 3 | 5 |
| C5 | 3 | 5 |
| C6 | 3 | 5 |
| C7 | 3 | 5 |
| C8 | 5 | 1 |
| C9 | 5 | 1 |
| C10 | 5 | 1 |
| C11 | 2 | 5 |
| C12 | 5 | 1 |

TABLE 8 extractability and residual indentation properties of examples according to the invention.

|  | Extractability | Residual indentation |
|---|---|---|
| EX1 | 3 | 1 |
| EX2 | 1 | 1 |
| EX3 | 3 | 1 |
| EX4 | 1 | 1 |
| EX5 | 1 | 1 |
| EX6 | 1 | 1 |
| EX7 | 1 | 1 |
| Ex8 | 1 | 1 |
| Ex9 | 1 | 1 |
| Ex10 | 1 | 1 |
| Ex11 | 1 | 1 |
| Ex12 | 1 | 1 |
| Ex13 | 1 | 1 |
| Ex14 | 1 | 1 |
| Ex15 | 1 | 3 |
| Ex16 | 1 | 1 |
| Ex17 | 1 | 1 |
| Ex18 | 1 | 1 |
| Ex19 | 1 | 1 |
| Ex20 | 1 | 1 |
| Ex21 | 1 | 1 |
| Ex22 | 1 | 1 |
| Ex23 | 1 | 1 |
| Ex24 | 1 | 1 |
| Ex25 | 1 | 1 |
| Ex26 | 1 | 1 |
| Ex27 | 1 | 1 |
| EX28 | 1 | 1 |
| Ex29 | 1 | 1 |
| Ex30 | 1 | 1 |
| Ex31 | 1 | 1 |

From the results of table 7, it appears that the layers comprising a polymeric matrix comprising an acid-based copolymer (comparative examples C2 to C4) and compositions comprising a polymeric matrix comprising an acid-based copolymer ionomer (comparative examples C5 to C7) have poor extractability properties and bad residual indentation, while layers comprising an anhydride copolymer, at the same concentration as the acid-based or ionomer-based polymer (comparative examples C8 to C10), have improved residual indentation but bad extractability properties. The layer having no anhydride copolymer but a metal oxide (ZnO in the comparative example C11) has poor extractability property and bad residual indentation property.

Surprisingly, from the results of table 8, it appears that the addition of the processing additive to a composition comprising an anhydride copolymer improves the extractability properties of the layers obtained while providing or maintaining a good residual indentation properties.

Further it also improves the overall processability of such compositions by having reduced sticky properties to other process devices such as internal and external mixers and devices of extrusion lines.

It appears also that a significant improvement of the residual indentation is observed for all type of polymers comprising anhydride groups used in combination with all type of polyolefin resin, or combination or resins, tested.

The compositions according to the invention present a clear improvement in comparison to acid-based polymers, even in comparison to acid-based polymers neutralised with zinc ions to form an ionomer.

Furthermore, it appears that titanium dioxide added to a composition comprising the anhydride polymer (comparative example C12) is not suitable to improve the extractability property of a layer having such a composition. One has to notice that this metal oxide is considered as being an acid metal oxide.

The at least one layer of the surface covering according to the present invention may be produced by any suitable process, for example by calendering, extrusion or melt extrusion.

The invention claimed is:

1. A PVC-free multiple layer surface covering comprising at least one layer of a thermoplastic composition, said thermoplastic composition comprising:
   a polymer-based matrix representing 100 parts in weight and comprising one or more olefin-based polymer(s) and one or more anhydride copolymer(s), said one or more anhydride copolymer(s) representing between 5 and 40 parts in weight of the polymer-based matrix,
   one or more filler(s) representing in weight at least 100 parts per 100 parts of said polymer-based matrix,
   one or more basic or amphoteric metal oxide(s) representing between 5 and 40 parts in weight per 100 parts of said polymer-based matrix.

2. The PVC-free multiple layer surface covering according to claim 1, wherein the polymer-based matrix comprises EVA, EMA, EBA, EEA, EPM, EPDM, VLDPE, LLDPE, polyolefin elastomers (POE), polyolefin plastomers (POP) or a combination thereof.

3. The PVC-free multiple layer surface covering according to claim 1, wherein the one or more anhydride copolymer(s) represents between 10 and 40 parts in weight of the polymer-based matrix and the one or more basic or amphoteric metal oxide(s) represents between 7.5 and 22.5 parts in weight per 100 parts of said polymer-based matrix.

4. The PVC-free multiple layer surface covering according to claim 1, wherein the one or more filler(s) is calcium carbonate and/or calcium magnesium carbonate.

5. The PVC-free multiple layer surface covering according to claim 1, wherein the anhydride copolymer comprises maleic anhydride monomers or olefin monomers grafted maleic anhydride groups.

6. The PVC-free multiple layer surface covering according to claim 1, wherein the one or more metal oxide is natrium oxide, lithium oxide, potassium oxide, rubidium oxide, iron oxide, beryllium oxide, magnesium oxide, calcium oxide, strontium oxide, barium oxide, copper oxide, aluminum oxide, lead oxide, zinc oxide or a combination thereof.

7. The PVC-free multiple layer surface covering according to claim 1, wherein the thermoplastic composition further comprises thermal or light stabilizers, antistatic additives, processing oils and/or other processing additives.

8. The PVC-free multiple layer surface covering according to claim 1, wherein the at least one layer of a thermoplastic composition is a support layer and said of PVC-free surface covering is a multiple layer surface covering.

9. The PVC-free multiple layer surface covering according to claim 8, further comprising a wear layer over the support layer and a polyurethane-based varnish layer over said wear layer.

10. A PVC-free multiple layer surface covering comprising at least one layer of a thermoplastic composition, said thermoplastic composition comprising:
    a polymer-based matrix representing 100 parts in weight and comprising one or more olefin-based polymer(s) and one or more anhydride copolymer(s), said one or more anhydride copolymer(s) representing between 5 and 40 parts in weight of the polymer-based matrix,
    one or more filler(s) representing in weight between 200 and 350 parts per 100 parts of said polymer-based matrix,
    one or more basic or amphoteric metal oxide(s) representing between 5 and 40 parts in weight per 100 parts of said polymer-based matrix.

11. The PVC-free multiple layer surface covering according to claim 10, wherein the polymer-based matrix comprises EVA, EMA, EBA, EEA, EPM, EPDM, VLDPE, LLDPE, polyolefin elastomers (POE), polyolefin plastomers (POP) or a combination thereof.

12. The PVC-free multiple layer surface covering according to claim 10, wherein the one or more anhydride copolymer(s) represents between 10 and 40 parts in weight of the polymer-based matrix and the one or more basic or amphoteric metal oxide(s) represents between 7.5 and 22.5 parts in weight per 100 parts of said polymer-based matrix.

13. The PVC-free multiple layer surface covering according to claim 10, wherein the one or more metal oxide is natrium oxide, lithium oxide, potassium oxide, rubidium oxide, iron oxide, beryllium oxide, magnesium oxide, calcium oxide, strontium oxide, barium oxide, copper oxide, aluminum oxide, lead oxide, zinc oxide or a combination thereof.

14. The PVC-free multiple layer surface covering according to claim 10, wherein the thermoplastic composition further comprises thermal or light stabilizers, antistatic additives, processing oils and/or other processing additives.

15. A PVC-free multiple layer surface covering comprising at least one layer of a thermoplastic composition, said thermoplastic composition comprising:
    a polymer-based matrix representing 100 parts in weight and comprising one or more olefin-based polymer(s) and one or more anhydride copolymer(s), said one or more anhydride copolymer(s) representing between 5 and 40 parts in weight of the polymer-based matrix, wherein the polymer-based matrix comprises EVA, EMA, EBA, EEA, EPM, EPDM, VLDPE, LLDPE, polyolefin elastomers (POE), polyolefin plastomers (POP) or a combination thereof, and wherein the one or more anhydride copolymer(s) represents between 10 and 40 parts in weight of the polymer-based matrix and the one or more basic or amphoteric metal oxide(s) represents between 7.5 and 22.5 parts in weight per 100 parts of said polymer-based matrix,
    one or more filler(s) representing in weight at least 100 parts per 100 parts of said polymer-based matrix,
    one or more basic or amphoteric metal oxide(s) representing between 5 and 40 parts in weight per 100 parts of said polymer-based matrix.

16. The PVC-free multiple layer surface covering according to claim 15, wherein the one or more filler(s) is calcium carbonate and/or calcium magnesium carbonate and represents in weight between 200 and 350 parts per 100 parts of the polymer-based matrix.

17. The PVC-free multiple layer surface covering according to claim 15, wherein the anhydride copolymer comprises maleic anhydride monomers or olefin monomers grafted maleic anhydride groups, and wherein the one or more metal oxide is natrium oxide, lithium oxide, potassium oxide, rubidium oxide, iron oxide, beryllium oxide, magnesium oxide, calcium oxide, strontium oxide, barium oxide, copper oxide, aluminum oxide, lead oxide, zinc oxide or a combination thereof.

18. The PVC-free multiple layer surface covering according to claim 15, wherein the thermoplastic composition further comprises thermal or light stabilizers, antistatic additives, processing oils and/or other processing additives.

19. The PVC-free multiple layer surface covering according to claim 15, wherein the at least one layer of a thermoplastic composition is a support layer and said of PVC-free surface covering is a multiple layer surface covering, the PVC-free multiple layer surface covering further comprising a wear layer over the support layer and a polyurethane-based varnish layer over said wear layer.

* * * * *